(12) United States Patent
Jung et al.

(10) Patent No.: US 12,474,532 B2
(45) Date of Patent: Nov. 18, 2025

(54) PHOTONIC STRUCTURE AND METHOD FOR MANUFACTURING THE SAME

(71) Applicant: TAIWAN SEMICONDUCTOR MANUFACTURING COMPANY LTD., Hsinchu (TW)

(72) Inventors: Ming Yang Jung, Kaohsiung (TW); Stefan Rusu, Sunnyvale, CA (US); Cheng-Tse Tang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 471 days.

(21) Appl. No.: 17/817,069

(22) Filed: Aug. 3, 2022

(65) Prior Publication Data
US 2024/0045159 A1    Feb. 8, 2024

(51) Int. Cl.
  *G02B 6/12*    (2006.01)
  *G02B 6/122*    (2006.01)
  *G02B 6/42*    (2006.01)

(52) U.S. Cl.
  CPC ........ *G02B 6/4283* (2013.01); *G02B 6/1228* (2013.01); *G02B 6/4214* (2013.01); *G02B 6/424* (2013.01); *G02B 2006/12097* (2013.01)

(58) Field of Classification Search
  CPC .................. G02B 6/1228; G02B 2006/12097
  See application file for complete search history.

(56) References Cited

U.S. PATENT DOCUMENTS

| | | | | |
|---|---|---|---|---|
| 10,649,245 B1 * | 5/2020 | Bian | ....................... | G02F 1/025 |
| 11,378,743 B1 * | 7/2022 | Bian | ...................... | G02B 6/305 |
| 2022/0229250 A1 * | 7/2022 | Bian | .................... | G02B 6/4298 |

OTHER PUBLICATIONS

Wesley D. Sacher et al., "Multilayer Silicon Nitride-on-Silicon Integrated Photonic Platforms and Devices," Journal of Lightwave Technology, Feb. 15, 2015, pp. 901-910, vol. 33, No. 4.

* cited by examiner

*Primary Examiner* — Eric Wong
(74) *Attorney, Agent, or Firm* — WPAT LAW; Anthony King

(57) ABSTRACT

A photonic structure and a method for manufacturing the same are provided. The photonic structure includes a substrate, an insulating structure, a first waveguide layer, a second waveguide layer and a high-dielectric constant material. The insulating structure is located over the substrate. The first waveguide layer is embedded in the insulating structure. The second waveguide layer is embedded in the insulating structure and longitudinally spaced apart from the first waveguide layer. The high-dielectric constant material is disposed between the first waveguide layer and the second waveguide layer.

20 Claims, 21 Drawing Sheets

PHOTONIC STRUCTURE AND METHOD FOR MANUFACTURING THE SAME

BACKGROUND

In silicon photonic devices, multi-layer waveguides can be integrated on a wafer for light transfer. A coupling efficiency between the multi-layer waveguides is affected by a gap between the multi-layer waveguides. The gap between the multi-layer waveguides should be controlled on a nano-scale to improve coupling efficiency and reduce insertion loss. However, the nano-scale gap is difficult to achieve in the integration process, leading to decreased coupling efficiency and increased insertion loss.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION

Figure 1:
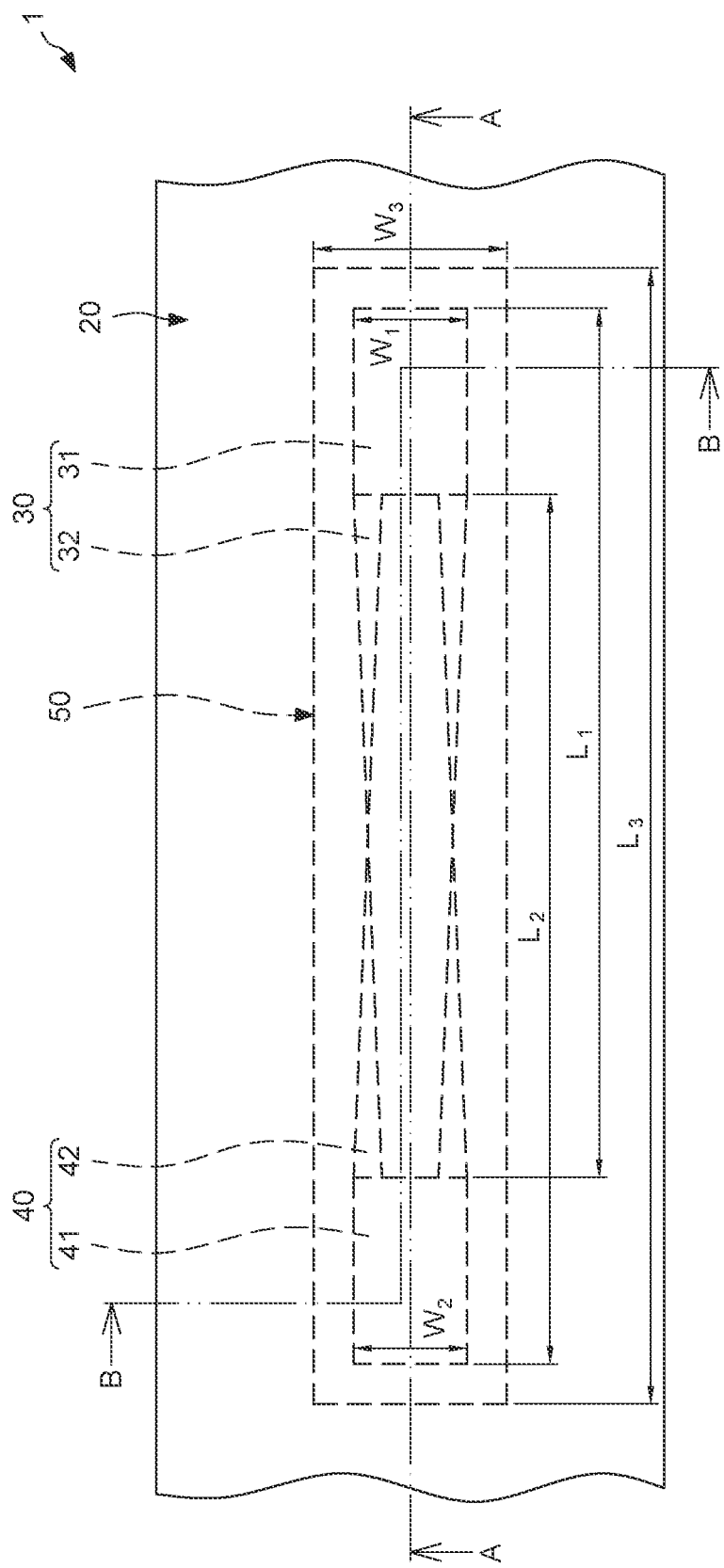
FIG. 1 illustrates a top view of a photonic structure according to some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 2:
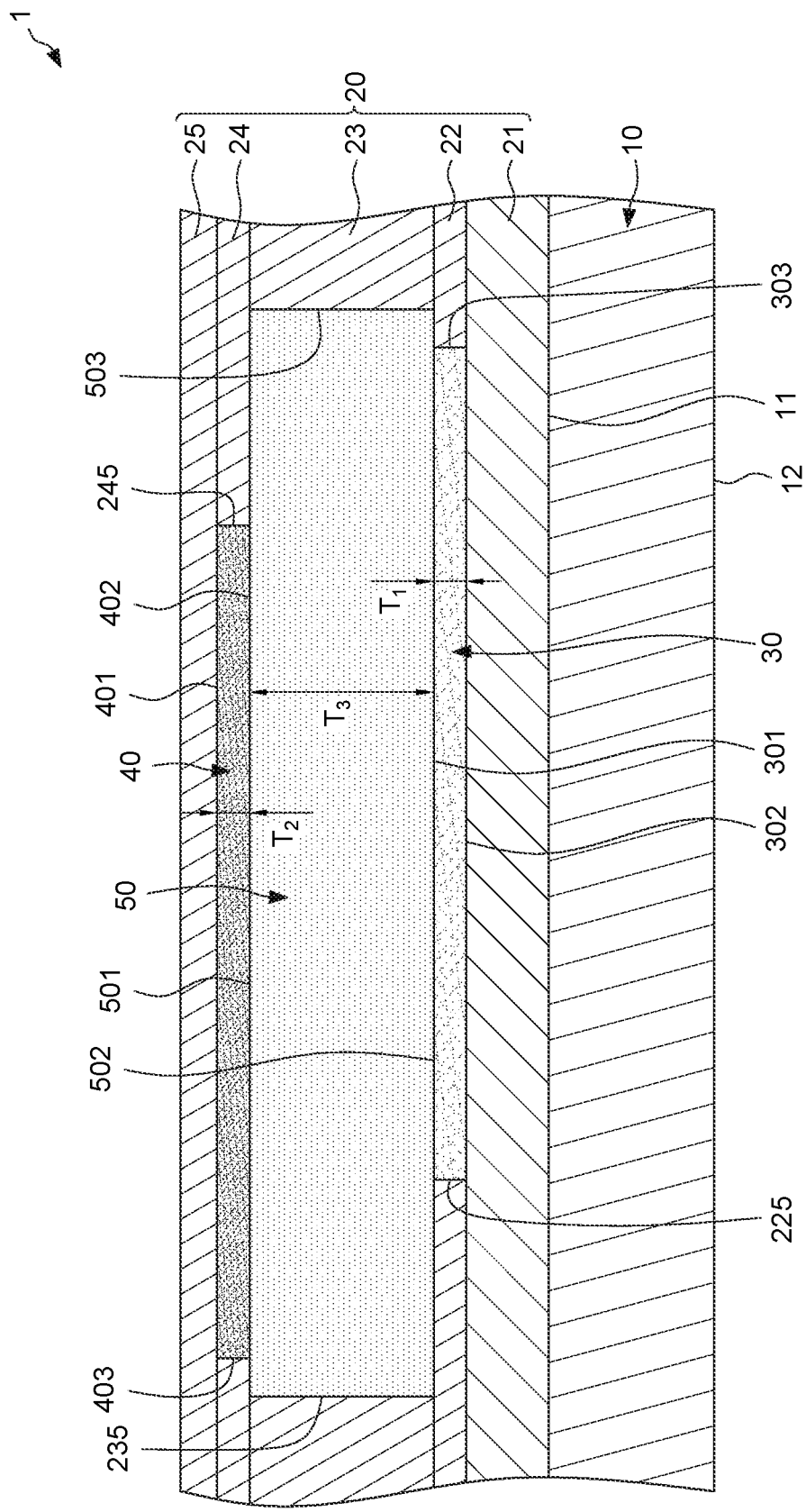
FIG. 2 illustrates a cross-sectional view along line A-A of FIG. 1.
Figure 3:
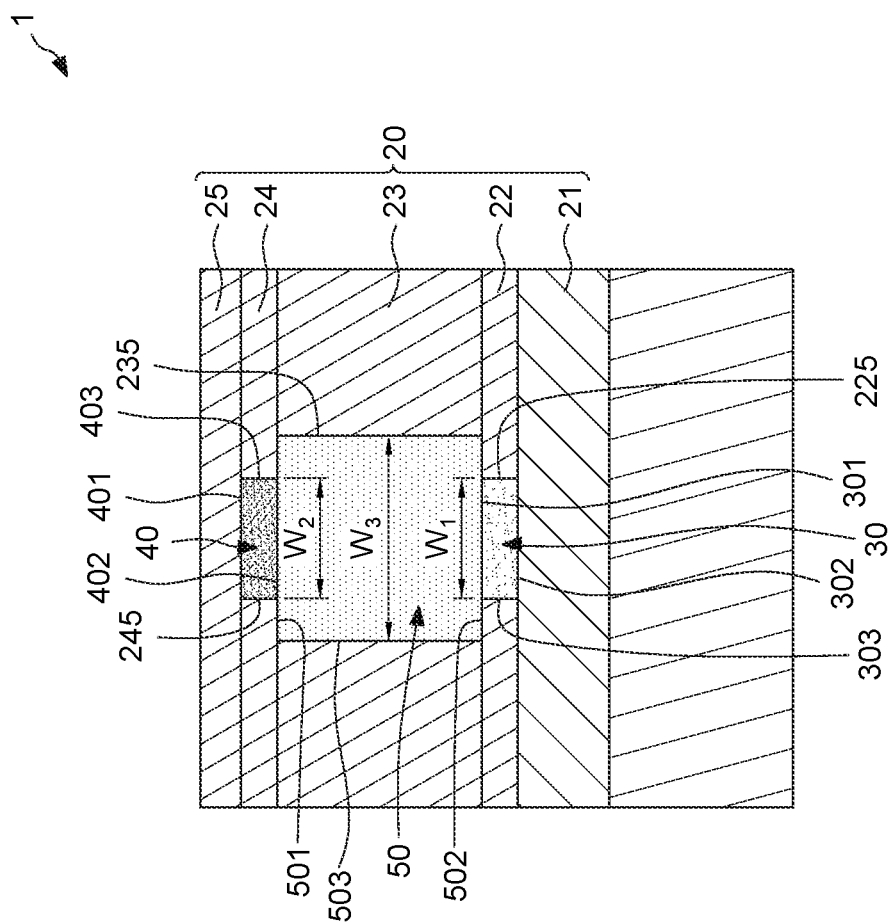
FIG. 3 illustrates a cross-sectional view along line B-B of FIG. 1.

FIG. 1 illustrates a top view of a photonic structure 1 according to some embodiments of the present disclosure. FIG. 2 illustrates a cross-sectional view along line A-A of FIG. 1. FIG. 3 illustrates a cross-sectional view along line B-B of FIG. 1. The photonic structure 1 can also be referred to as "photonic die" or "P-die." As shown in FIG. 1 and FIG. 2, the photonic structure 1 includes a substrate 10, an insulating structure 20, a plurality of waveguide layers (including, for example, a first waveguide layer 30 and a second waveguide layer 40) and a high-dielectric constant (high-κ) material 50. In some embodiments, the photonic structure 1 can be used to constitute a high-speed transceiver.

The substrate 10 can be, for example, silicon substrate. The substrate 10 has a first surface 11 (e.g., a top surface) and a second surface 12 (e.g., a bottom surface) opposite to the first surface 11.

The insulating structure 20 is located over the substrate 10. In some embodiments, as shown in FIG. 2, the insulating structure 20 can include a plurality of insulating layers (including, for example, a first insulating layer 21, a second insulating layer 22, a third insulating layer 23, a fourth insulating layer 24 and a fifth insulating layer 25). The insulating layers (e.g., the first insulating layer 21, the second insulating layer 22, the third insulating layer 23, the fourth insulating layer 24 and the fifth insulating layer 25) are stacked on one another. For example, the first insulating layer 21 can be the bottommost insulating layer and formed on the first surface 11 of the substrate 10. A material of the insulating structure 20 (including, for example, the first insulating layer 21, the second insulating layer 22, the third insulating layer 23, the fourth insulating layer 24 and the fifth insulating layer 25) can be, for example, a low-dielectric constant (low-K) material or a low-refractive index material. Thus, the insulating structure 20 can function as a cladding for waveguides.

In some embodiments, a material of the first insulating layer 21 can be different from a material of the other insulating layers (e.g., the second insulating layer 22, the third insulating layer 23, the fourth insulating layer 24 and the fifth insulating layer 25). In some embodiments, the material of the first insulating layer 21 can be, for example, buried oxide. The material of the other insulating layers (e.g., the second insulating layer 22, the third insulating layer 23, the fourth insulating layer 24 and the fifth insulating layer 25) can be, for example, silicon dioxide ($SiO_2$). In some embodiments, the second insulating layer 22 can define at least one opening 225 extending through the second insulating layer 22. The third insulating layer 23 can define at least one opening 235 extending through the third insulating layer 23. The fourth insulating layer 24 can define at least one opening 245 extending through the fourth insulating layer 24.

The plurality of waveguide layers (e.g., the first waveguide layer 30 and the second waveguide layer 40) are embedded in the insulating structure 20 and longitudinally spaced apart from each other. The first waveguide layer 30 and the second waveguide layer 40 are configured to transmit light. As shown in FIG. 2, the first waveguide layer 30 is embedded in the second insulating layer 22 and on a top surface of the first insulating layer 21. In some embodiments, the first waveguide layer 30 can be disposed in the at least one opening 225 of the second insulating layer 22. Thus, the first waveguide layer 30 extends through the second insulating layer 22. The first waveguide layer 30 can have a top surface 301, a bottom surface 302 opposite to the top surface 301, and a peripheral surface 303 extending between the top surface 301 and the bottom surface 302. In some embodiments, the top surface 301 of the first waveguide layer 30 can be substantially coplanar with a top surface of the second insulating layer 22. The bottom surface 302 of the first waveguide layer 30 can be substantially coplanar with a bottom surface of the second insulating layer 22. A material of the first waveguide layer 30 is different from the material of the insulating structure 20 (including, for example, the first insulating layer 21, the second insulating layer 22, the third insulating layer 23, the fourth insulating layer 24 and the fifth insulating layer 25). In some embodiments, a dielectric constant (or a refractive index) of the first waveguide layer 30 can be greater than the dielectric constant (or the refractive index) of the insulating structure 20 (including, for example, the first insulating layer 21, the second insulating layer 22, the third insulating layer 23, the fourth insulating layer 24 and the fifth insulating layer 25). In some embodiments, the material of the first waveguide layer 30 can be, for example, silicon nitride ($Si_3N_4$) or silicon (Si).

In some embodiments, as shown in FIG. 1, the first waveguide layer 30 can include a first portion 31 and a second portion 32. The first portion 31 can also be referred to as "input end" or "output end." The first portion 31 can be a square in shape. The second portion 32 extends outwardly from a side of the first portion 31. In addition, the second portion 32 tapers in a direction away from the side of the first portion 31. In some embodiments, the second portion 32 can also be referred to as "waveguide portion."

The high-dielectric constant material 50 can also be referred to as "first high-dielectric constant material" or "first coupling material." As shown in FIG. 2 and FIG. 3, the high-dielectric constant material 50 is disposed on the second insulating layer 22 and covers the first waveguide layer 30. The high-dielectric constant material 50 can be embedded in the third insulating layer 23 and on the top surface of the second insulating layer 22. In some embodiments, the high-dielectric constant material 50 can be disposed in the at least one opening 235 of the third insulating layer 23. Thus, the high-dielectric constant material 50 extends through the third insulating layer 23. In some embodiments, the high-dielectric constant material 50 can cover the entire top surface 301 of the first waveguide layer 30. The high-dielectric constant material 50 can have a top surface 501, a bottom surface 502 opposite to the top surface 501, and a peripheral surface 503 extending between the top surface 501 and the bottom surface 502. In some embodiments, the top surface 501 of the high-dielectric constant material 50 can be substantially coplanar with a top surface of the third insulating layer 23. The bottom surface 502 of the high-dielectric constant material 50 can be substantially coplanar with a bottom surface of the third insulating layer 23. In some embodiments, as shown in FIG. 1, the high-dielectric constant material 50 can extend outwardly from the peripheral surface 303 of the first waveguide layer 30 in the top view. That is, a maximum width $W_3$ of the high-dielectric constant material 50 can be greater than a maximum width $W_1$ (i.e., a width of the first portion 31) of the first waveguide layer 30. In addition, a shape of the high-dielectric constant material 50 can be different from a shape of the first waveguide layer 30 in the top view. As shown in FIG. 1, the high-dielectric constant material 50 can be a rectangle in shape.

In some embodiments, as shown in FIG. 2, a thickness $T_3$ of the high-dielectric constant material 50 can be greater than a thickness $T_1$ of the first waveguide layer 30. In some embodiments, the thickness $T_3$ of the high-dielectric constant material 50 can be 0.01 μm to 10 μm. In some embodiments, the thickness $T_3$ of the high-dielectric constant material can be equal to the thickness $T_1$ of the first waveguide layer 30. In addition, as shown in FIG. 1, a length $L_3$ of the high-dielectric constant material 50 can be greater than a length $L_1$ of the first waveguide layer 30. In some embodiments, the length $L_3$ of the high-dielectric constant material 50 can be 0.01 μm to 3000 μm.

The high-dielectric constant material 50 is different from the material of the insulating structure 20 (including, for example, the first insulating layer 21, the second insulating layer 22, the third insulating layer 23, the fourth insulating layer 24 and the fifth insulating layer 25) and the material of the first waveguide layer 30. In some embodiments, a dielectric constant (or a refractive index) of the high-dielectric constant material 50 can be different from the dielectric constant (or the refractive index) of the first waveguide layer 30 and the dielectric constant (or the refractive index) of the insulating structure 20 (including, for example, the first insulating layer 21, the second insulating layer 22, the third insulating layer 23, the fourth insulating layer 24 and the fifth insulating layer 25). In some embodiments, the dielectric constant (or the refractive index) of the high-dielectric constant material 50 can be greater than the dielectric constant (or the refractive index) of the first waveguide layer 30 and the dielectric constant (or the refractive index) of the insulating structure 20 (including, for example, the first insulating layer 21, the second insulating layer 22, the third insulating layer 23, the fourth insulating layer 24 and the fifth insulating layer 25). In some embodiments, the high-dielectric constant material 50 can be, for example, titanium dioxide ($TiO_2$), tantalum oxide ($Ta_2O_5$), aluminum oxide ($Al_2O_3$), zirconium dioxide ($ZrO_2$), lanthanum oxide ($La_2O_3$), praseodymium oxide ($Pr_2O_3$) or hafnium dioxide ($HfO_2$). In some embodiments, the refractive index of the high-dielectric constant material 50 can be 2 to 20.

The second waveguide layer 40 is longitudinally spaced apart from the first waveguide layer 30. As shown in FIG. 2, the second waveguide layer 40 can be embedded in the fourth insulating layer 24 and on the top surface 501 of the high-dielectric constant material 50. That is, the high-dielectric constant material 50 is disposed between the first waveguide layer 30 and the second waveguide layer 40. Thus, the high-dielectric constant material 50 can transfer light between the first waveguide layer 30 and the second waveguide layer 40. In some embodiments, the second waveguide layer 40 can be disposed in the at least one opening 245 of the fourth insulating layer 24. Thus, the second waveguide layer 40 extends through the fourth insulating layer 24. In some embodiments, the second waveguide layer 40 can cover a portion of the high-dielectric constant material 50. The second waveguide layer 40 can have a top surface 401, a bottom surface 402 opposite to the top surface 401, and a peripheral surface 403 extending between the top surface 401 and the bottom surface 402. In some embodiments, the top surface 401 of the second waveguide layer 40 can be substantially coplanar with a top surface of the fourth insulating layer 24. The bottom surface 402 of the second waveguide layer 40 can be substantially coplanar with a bottom surface of the fourth insulating layer 24 and the top surface 501 of the high-dielectric constant material 50. A material of the second waveguide layer 40 is different from the material of the insulating structure 20 (including, for example, the first insulating layer 21, the second insulating layer 22, the third insulating layer 23, the fourth insulating layer 24 and the fifth insulating layer 25). In some embodiments, a dielectric constant (or a refractive index) of the second waveguide layer 40 can be greater than the dielectric constant (or the refractive index) of the insulating structure 20 (including, for example, the first insulating layer 21, the second insulating layer 22, the third insulating layer 23, the fourth insulating layer 24 and the fifth insulating layer 25). In some embodiments, the material of the second waveguide layer 40 can be, for example, silicon nitride ($Si_3N_4$) or silicon (Si). In some embodiments, the material of the second waveguide layer 40 can be the same as the material of the first waveguide layer 30. In some embodiments, the material of the second waveguide layer 40 can be different from the material of the first waveguide layer 30.

In addition, the material of the second waveguide layer 40 is different from the high-dielectric constant material 50. For example, a dielectric constant (or a refractive index) of the second waveguide layer 40 can be different from the dielectric constant (or the refractive index) of the high-dielectric constant material 50. In some embodiments, the dielectric constant (or the refractive index) of the high-dielectric constant material 50 can be greater than the dielectric constant (or the refractive index) of the second waveguide layer 40.

In some embodiments, as shown in FIG. 1, the second waveguide layer 40 can include a first portion 41 and a second portion 42. The first portion 41 can also be referred to as "input end" or "output end." The first portion 41 can be a square in shape. The second portion 42 extends outwardly from a side of the first portion 41. In the top view, the second portion 42 of the second waveguide layer 40 tapers toward the first portion 31 of the first waveguide layer 30. In some embodiments, the second portion 42 of the second waveguide layer 40 can also be referred to as "waveguide portion." In some embodiments, a shape of the second waveguide layer 40 can be the same as the shape of the first waveguide layer 30.

In some embodiments, as shown in FIG. 1, the high-dielectric constant material 50 can extend outwardly from the peripheral surface 403 of the second waveguide layer 40 in the top view. That is, the maximum width $W_3$ of the high-dielectric constant material 50 can be greater than a maximum width $W_2$ (i.e., a width of the first portion 41) of the second waveguide layer 40. In addition, the shape of the second waveguide layer 40 can be different from the shape of the high-dielectric constant material 50 in the top view.

In some embodiments, as shown in FIG. 2, the thickness $T_3$ of the high-dielectric constant material 50 can be greater than a thickness $T_2$ of the second waveguide layer 40. In some embodiments, the thickness $T_2$ of the second waveguide layer 40 can be equal to the thickness $T_3$ of the high-dielectric constant material 50. In addition, as shown in FIG. 1, the length $L_3$ of the high-dielectric constant material 50 can be greater than a length $L_2$ of the second waveguide layer 40. The fifth insulating layer 25 of the insulating structure 20 can cover the second waveguide layer 40 to protect the second waveguide layer 40.

In the embodiment illustrated in FIG. 1 to FIG. 3, the high-dielectric constant material 50 disposed between the first waveguide layer 30 and the second waveguide layer 40 can increase the gap tolerance between the first waveguide layer 30 and the second waveguide layer 40, improving coupling efficiency. Therefore, the gap control on a nanoscale is not required in manufacturing the photonic structure 1. In addition, the high-dielectric constant material 50 also reduces the transfer length between the first waveguide layer 30 and the second waveguide layer 40, decreasing insertion loss.

Figure 4:
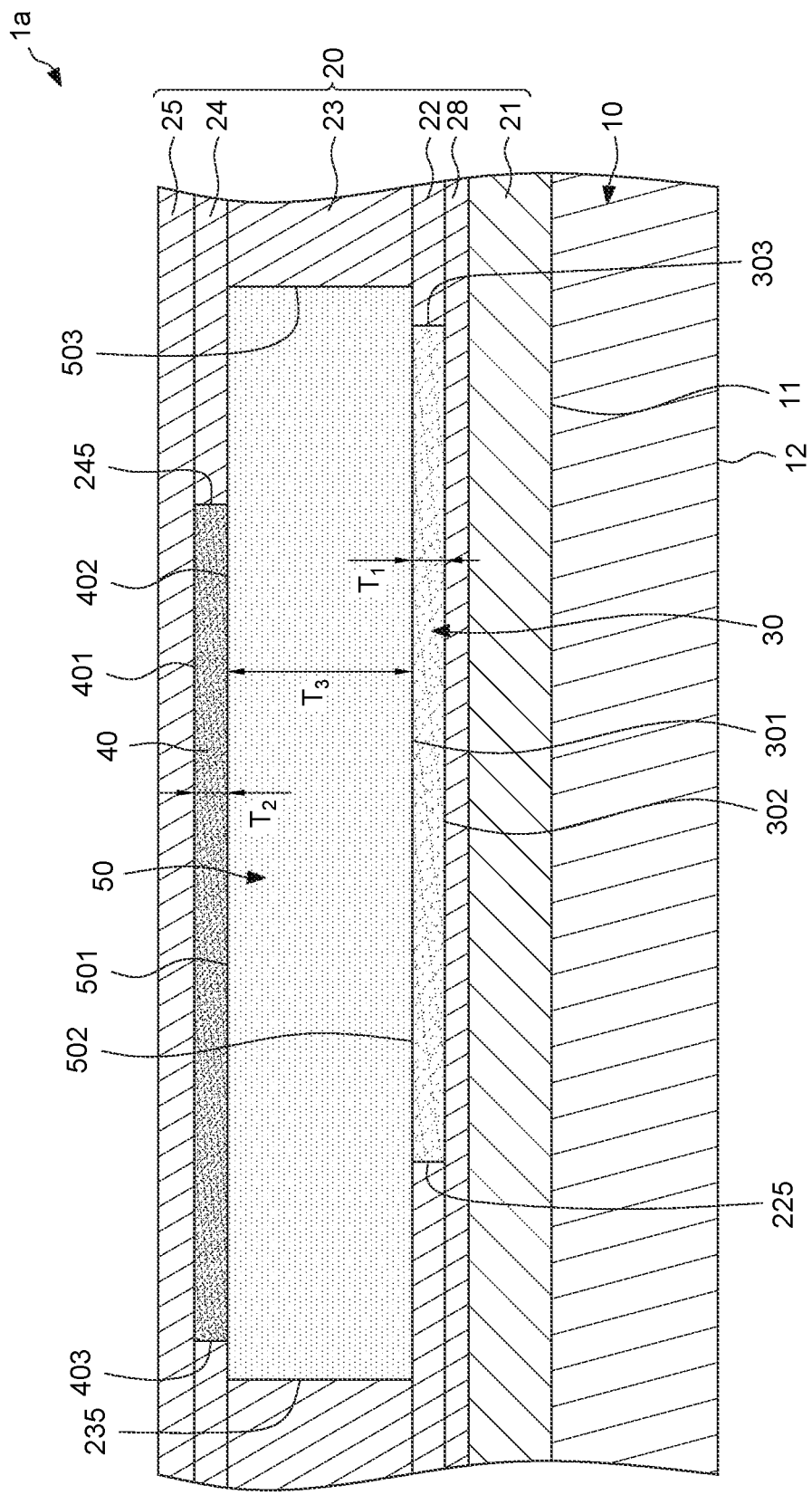
FIG. 4 illustrates a cross-sectional view of a photonic structure according to some embodiments of the present disclosure.

FIG. 4 illustrates a cross-sectional view of a photonic structure 1a according to some embodiments of the present disclosure. The photonic structure 1a of FIG. 4 is similar to the photonic structure 1 of FIG. 2, except for a structure of the insulating structure 20a. In some embodiments, as shown in FIG. 4, the insulating structure 20a further includes a support insulating layer 28 between the first insulating layer 21 and the second insulating layer 22. The first waveguide layer 30 can be disposed on the support insulating layer 28. A material of the support insulating layer 28 can be the same as the material of the second insulating layer 22 and different from the material of the first insulating layer 21. In some embodiments, the material of the support insulating layer 28 can be, for example, silicon dioxide ($SiO_2$). In some embodiments, a thickness of the support insulating layer 28 can be less than a thickness of the first insulating layer 21. The material of the first waveguide layer 30 can be the same as the material of the second waveguide layer 40, such as silicon nitride ($Si_3N_4$).

Figure 5:
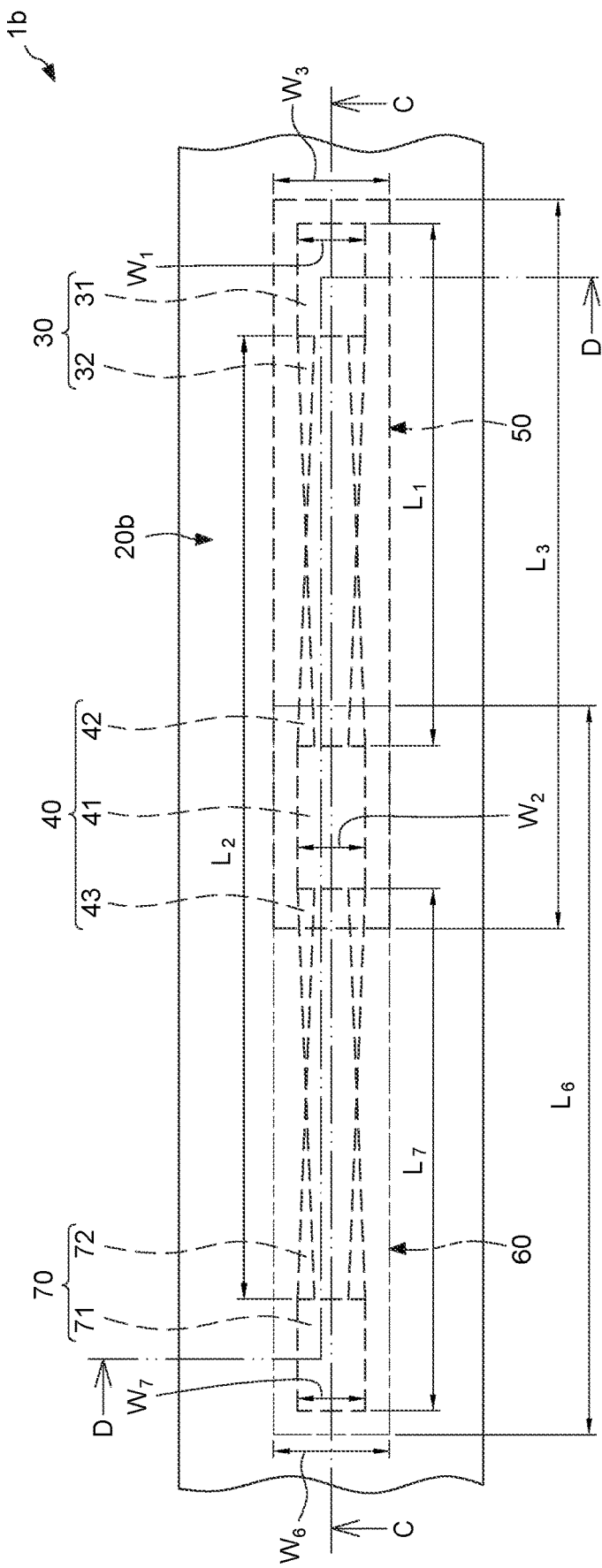
FIG. 5 illustrates a top view of a photonic structure according to some embodiments of the present disclosure.
Figure 6:
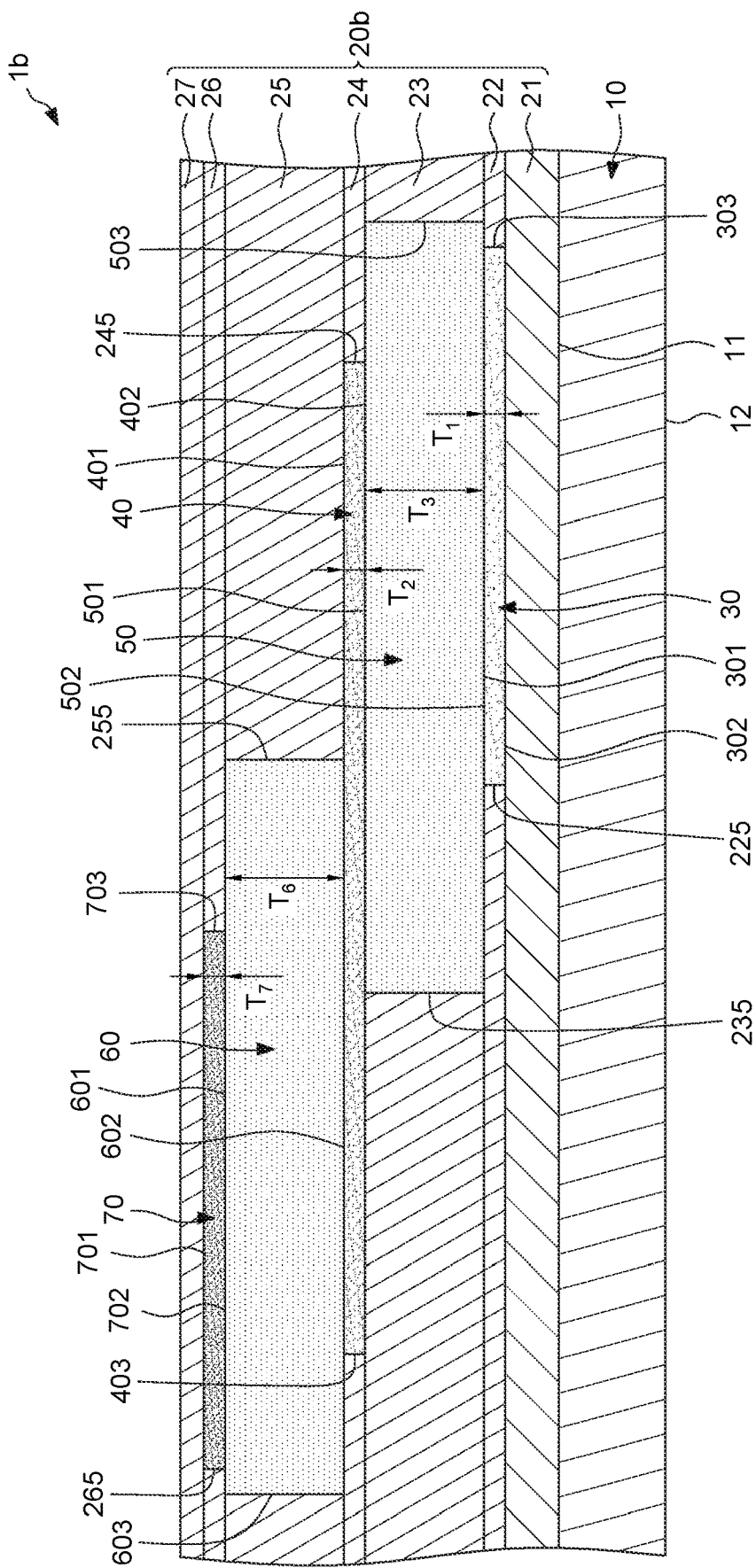
FIG. 6 illustrates a cross-sectional view along line C-C of FIG. 5.
Figure 7:
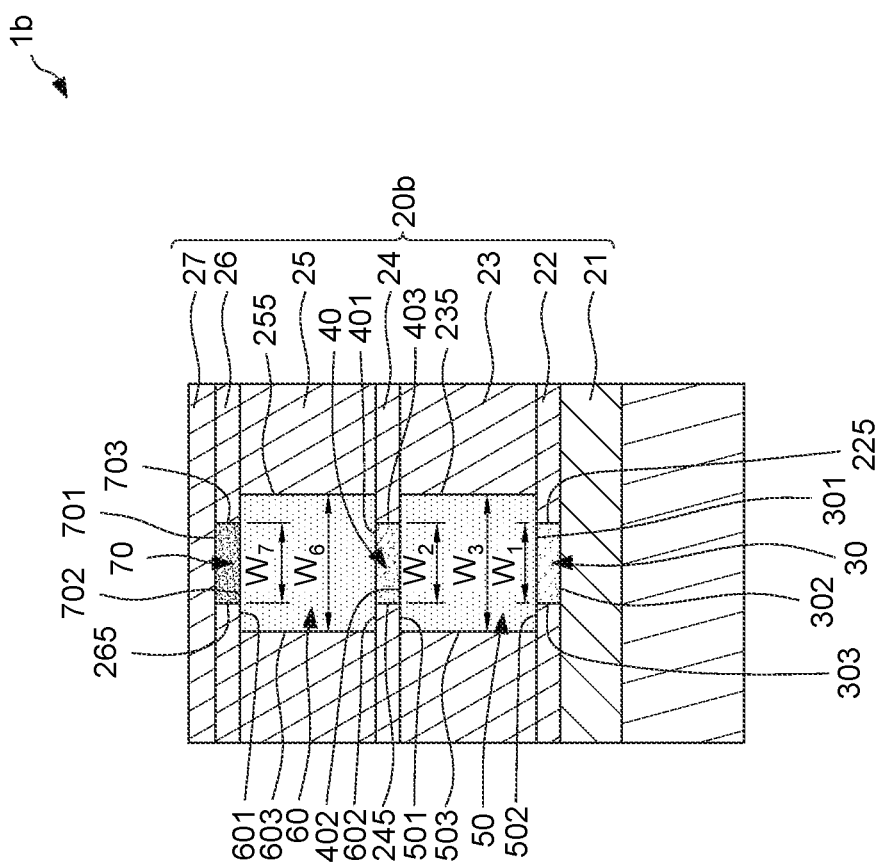
FIG. 7 illustrates a cross-sectional view along line D-D of FIG. 5.

FIG. 5 illustrates a top view of a photonic structure 1b according to some embodiments of the present disclosure. FIG. 6 illustrates a cross-sectional view along line C-C of FIG. 5. FIG. 7 illustrates a cross-sectional view along line D-D of FIG. 5. The photonic structure 1b of FIG. 5 through FIG. 7 is similar to the photonic structure 1 of FIG. 1 through FIG. 3, except that the photonic structure 1b further includes an upper high-dielectric constant material 60 and a third waveguide layer 70. The upper high-dielectric constant material 60 can also be referred to as "second high-dielectric constant material" or "second coupling material." As shown in FIG. 6 and FIG. 7, the upper high-dielectric constant material 60 is disposed on the fourth insulating layer 24 and covers the second waveguide layer 40. In some embodiments, as shown in FIG. 5, the second waveguide layer 40 can further include a third portion 43 opposite to the second portion 42. The third portion 43 and the second portion 42 of the second waveguide layer 40 are symmetrical in structure. Thus, a taper direction of the third portion 43 is opposite to a taper direction of the second portion 42. In some embodiments, a shape of the third portion 43 can be the same as a shape of the second portion 42. In some embodiments, the third portion 43 of the second waveguide layer 40 can also be referred to as "waveguide portion." As shown in FIG. 6 and FIG. 7, the upper high-dielectric constant material 60 can be embedded in the fifth insulating layer 25 and on the top surface of the fourth insulating layer 24. In some embodiments, the upper high-dielectric constant material 60 can be disposed in at least one opening 255 of the fifth insulating layer 25. Thus, the upper high-dielectric constant material 60 extends through the fifth insulating layer 25. In some embodiments, the upper high-dielectric constant material 60 can cover the entire top surface 401 of the second waveguide layer 40 (including, for example, the first portion 41, the second portion 42 and the third portion 43). The upper high-dielectric constant material 60 can have a top surface 601, a bottom surface 602 opposite to the top surface 601, and a peripheral surface 603 extending between the top surface 601 and the bottom surface 602. In some embodiments, the top surface 601 of the upper high-dielectric constant material 60 can be substantially coplanar with a top surface of the fifth insulating layer 25. The bottom surface 602 of the upper high-dielectric constant material 60 can be substantially coplanar with a bottom surface of the fifth insulating layer 25. In some embodiments, as shown in FIG. 5, the upper high-dielectric constant material 60 can extend outwardly from the peripheral surface 403 of the second waveguide layer 40 in the top view. That is, a maximum width $W_6$ of the upper high-dielectric constant material 60 can be greater than the maximum width $W_2$ (i.e., the width of the first portion 41) of the second waveguide layer 40. In some embodiments, a shape of the upper high-dielectric constant material 60 can be the same as the shape of the high-dielectric constant material 50 in the top view.

In some embodiments, the upper high-dielectric constant material 60 can be different form the material of the second waveguide layer 40 and the high-dielectric constant material 50. In some embodiments, a dielectric constant (or a refractive index) of the upper high-dielectric constant material 60 can be different from the dielectric constant (or the refractive index) of the second waveguide layer 40 and the dielectric constant (or the refractive index) of the high-dielectric constant material 50. In some embodiments, the dielectric constant (or the refractive index) of the upper high-dielectric constant material 60 can be greater than the dielectric constant (or the refractive index) of the second waveguide layer 40 and the dielectric constant (or the refractive index) of the high-dielectric constant material 50. In some embodiments, the upper high-dielectric constant material 60 can be, for example, titanium dioxide ($TiO_2$), tantalum oxide ($Ta_2O_5$), aluminum oxide ($Al_2O_3$), zirconium dioxide ($ZrO_2$), lanthanum oxide ($La_2O_3$), praseodymium oxide ($Pr_2O_3$) or hafnium dioxide ($HfO_2$). In some embodiments, the refractive index of the upper high-dielectric constant material 60 can be 2 to 20.

In some embodiments, as shown in FIG. 6, the insulating structure 20b further includes a sixth insulating layer 26 and a seventh insulating layer 27. The sixth insulating layer 26 is stacked on the fifth insulating layer 25. The seventh insulating layer 27 is stacked on the sixth insulating layer 26. The sixth insulating layer 26 can define at least one opening 265 extending through the sixth insulating layer 26. The third waveguide layer 70 is embedded in the insulating structure 20 and longitudinally spaced apart from the second waveguide layer 40. As shown in FIG. 6, third waveguide layer 70 can be embedded in the sixth insulating layer 26 and on the top surface 601 of the upper high-dielectric constant material 60. That is, the upper high-dielectric constant material 60 is disposed between the third waveguide layer 70 and the second waveguide layer 40. Thus, the upper high-dielectric constant material 60 can transfer light between the third waveguide layer 70 and the second waveguide layer 40. In some embodiments, the third waveguide layer 70 can be disposed in the at least one opening 265 of the sixth insulating layer 26. Thus, the third waveguide layer 70 extends through the sixth insulating layer 2. In some embodiments, the third waveguide layer 70 can cover a portion of the upper high-dielectric constant material 60. The third waveguide layer 70 can have a top surface 701, a bottom surface 702 opposite to the top surface 701, and a peripheral surface 703 extending between the top surface 701 and the bottom surface 702. In some embodiments, the top surface 701 of the third waveguide layer 70 can be substantially coplanar with a top surface of the sixth insulating layer 26. The bottom surface 702 of the third waveguide layer 70 can be substantially coplanar with a bottom surface of the sixth insulating layer 26 and the top surface 601 of the upper high-dielectric constant material 60. A material of the third waveguide layer 70 is different from the material of the insulating structure 20*b* (including, for example, the first insulating layer 21, the second insulating layer 22, the third insulating layer 23, the fourth insulating layer 24, the fifth insulating layer 25, the sixth insulating layer 26 and the seventh insulating layer 27). In some embodiments, a dielectric constant (or a refractive index) of the third waveguide layer 70 can be greater than the dielectric constant (or the refractive index) of the insulating structure 20*b* (including, for example, the first insulating layer 21, the second insulating layer 22, the third insulating layer 23, the fourth insulating layer 24, the fifth insulating layer 25, the sixth insulating layer 26 and the seventh insulating layer 27). In some embodiments, the material of the third waveguide layer 70 can be, for example, silicon nitride ($Si_3N_4$) or silicon (Si). In some embodiments, the material of the third waveguide layer 70 can be the same as the material of the second waveguide layer 40. In some embodiments, the material of the third waveguide layer 70 can be different from the material of the second waveguide layer 40.

In addition, the material of the third waveguide layer 70 is different from the upper high-dielectric constant material 60. For example, a dielectric constant (or a refractive index) of the third waveguide layer 70 can be different from the dielectric constant (or the refractive index) of the upper high-dielectric constant material 60. In some embodiments, the dielectric constant (or the refractive index) of the upper high-dielectric constant material 60 can be greater than the dielectric constant (or the refractive index) of the third waveguide layer 70.

In some embodiments, as shown in FIG. 5, the third waveguide layer 70 can include a first portion 71 and a second portion 72. The first portion 71 can also be referred to as "input end" or "output end." The first portion 71 can be a square in shape. The second portion 72 extends outwardly from a side of the first portion 71. In the top view, the second portion 72 of the third waveguide layer 70 tapers toward the first portion 41 of the second waveguide layer 40. In some embodiments, the second portion 72 of the third waveguide layer 70 can also be referred to as "waveguide portion." In some embodiments, a shape of the third waveguide layer 70 can be the same as the shape of the first waveguide layer 30.

In some embodiments, as shown in FIG. 5, the upper high-dielectric constant material 60 can extend outwardly from the peripheral surface 703 of the third waveguide layer 70 in the top view. That is, the maximum width $W_6$ of the upper high-dielectric constant material 60 can be greater than a maximum width $W_7$ (i.e., a width of the first portion 71) of the third waveguide layer 70. In addition, a length $L_6$ of the upper high-dielectric constant material 60 can be greater than a length $L_7$ of the third waveguide layer 70. In some embodiments, the length $L_6$ of the upper high-dielectric constant material 60 can be 0.01 μm to 3000 μm. In some embodiments, as shown in FIG. 6, a thickness $T_6$ of the upper high-dielectric constant material 60 can be greater than a thickness $T_7$ of the third waveguide layer 70. In some embodiments, the thickness $T_6$ of the upper high-dielectric constant material 60 can be 0.01 μm to 10 μm. In some embodiments, the thickness $T_7$ of the third waveguide layer 70 can be equal to the thickness $T_6$ of the upper high-dielectric constant material 60. The seventh insulating layer 27 of the insulating structure 20*b* can cover the third waveguide layer 70 to protect the third waveguide layer 70.

Figure 8:
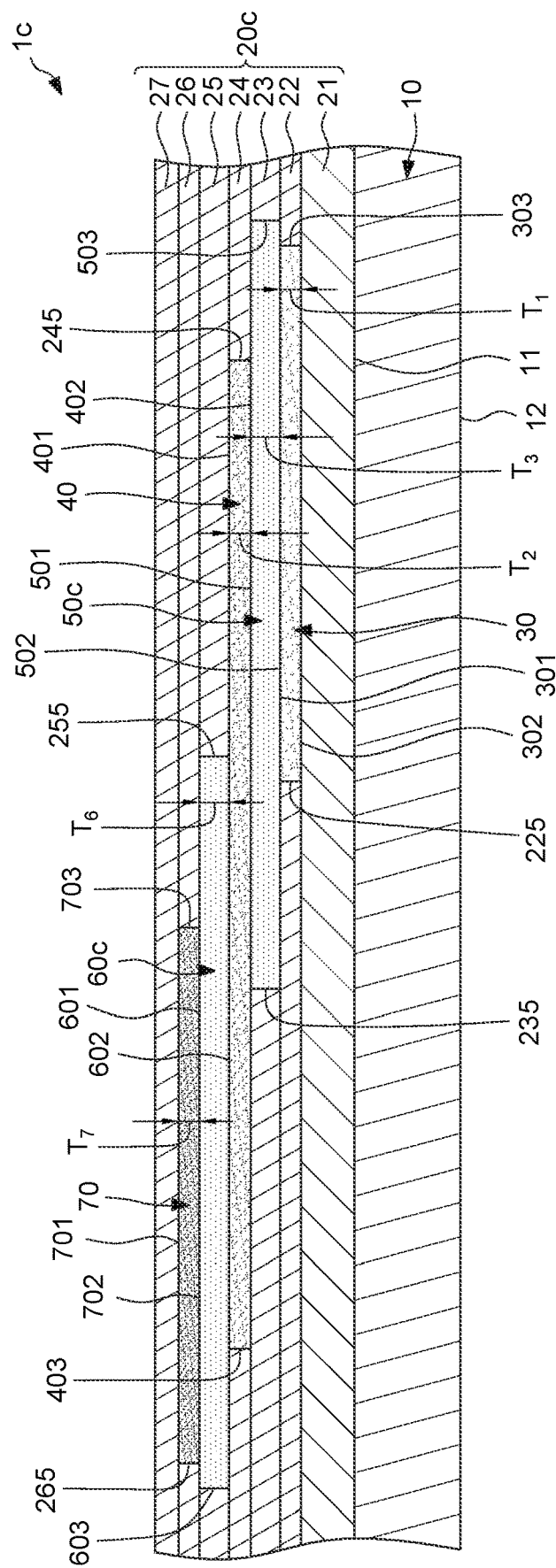
FIG. 8 illustrates a cross-sectional of a photonic structure according to some embodiments of the present disclosure.

FIG. 8 illustrates a cross-sectional of a photonic structure 1*c* according to some embodiments of the present disclosure. The photonic structure 1*c* of FIG. 8 is similar to the photonic structure 1*b* of FIG. 6, except for thicknesses of the high-dielectric constant material 50*c* and the upper high-dielectric constant material 60*c*. In some embodiments, as shown in FIG. 8, the thicknesses of the high-dielectric constant material 50*c* and the upper high-dielectric constant material 60*c* can be reduced to adjust the gap between the first waveguide layer 30 and the second waveguide layer 40 and the gap between the second waveguide layer 40 and the third waveguide layer 70. A thickness of the insulating structure 20*c* can also be reduced.

Figure 9:
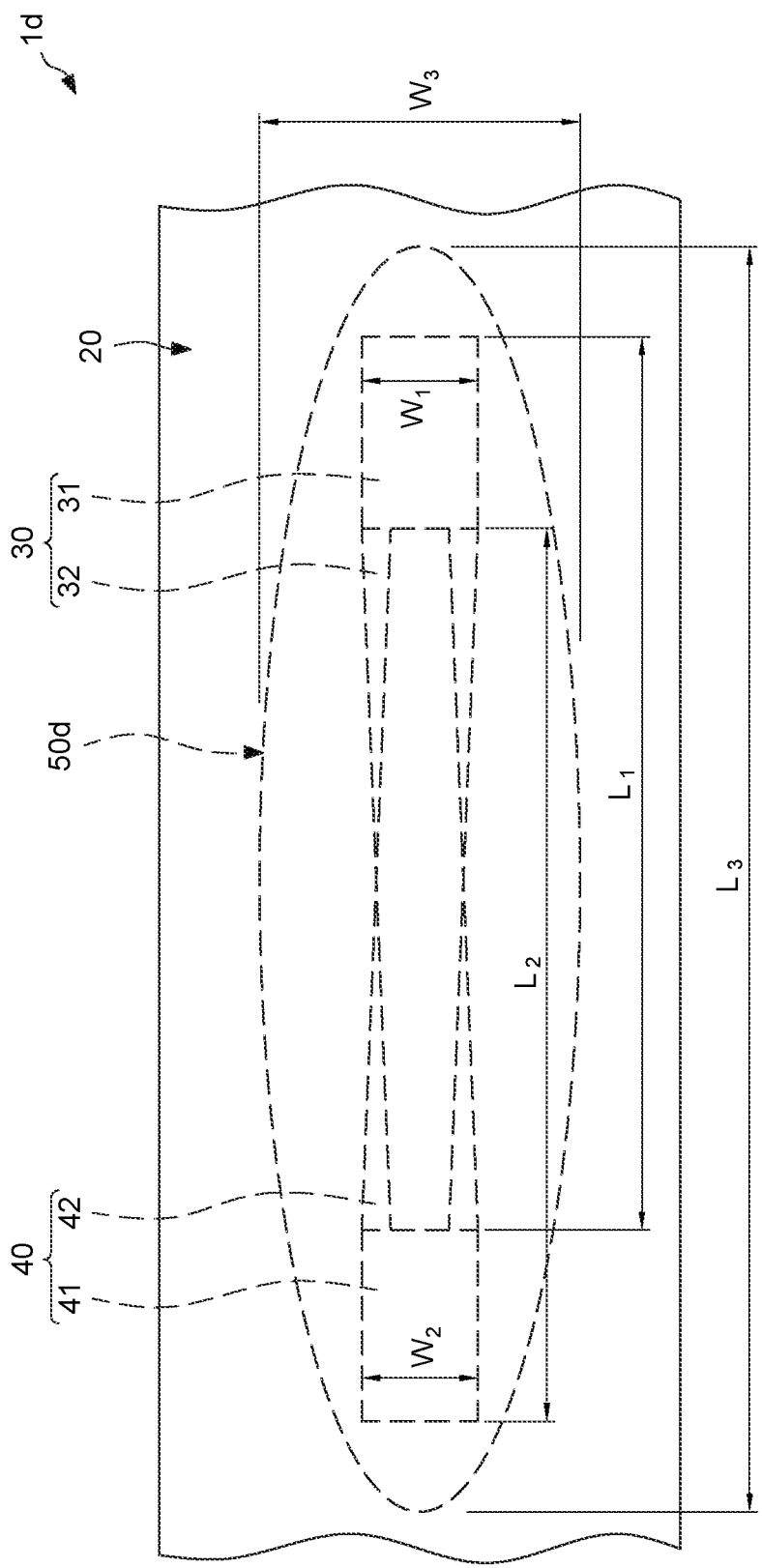
FIG. 9 illustrates a top view of a photonic structure according to some embodiments of the present disclosure.

FIG. 9 illustrates a top view of a photonic structure 1*d* according to some embodiments of the present disclosure. The photonic structure 1*d* of FIG. 9 is similar to the photonic structure 1 of FIG. 1, except for a shape of the high-dielectric constant material 50*d*. In some embodiments, as shown in FIG. 9, the high-dielectric constant material 50*d* can be elliptic in shape.

Figure 10:
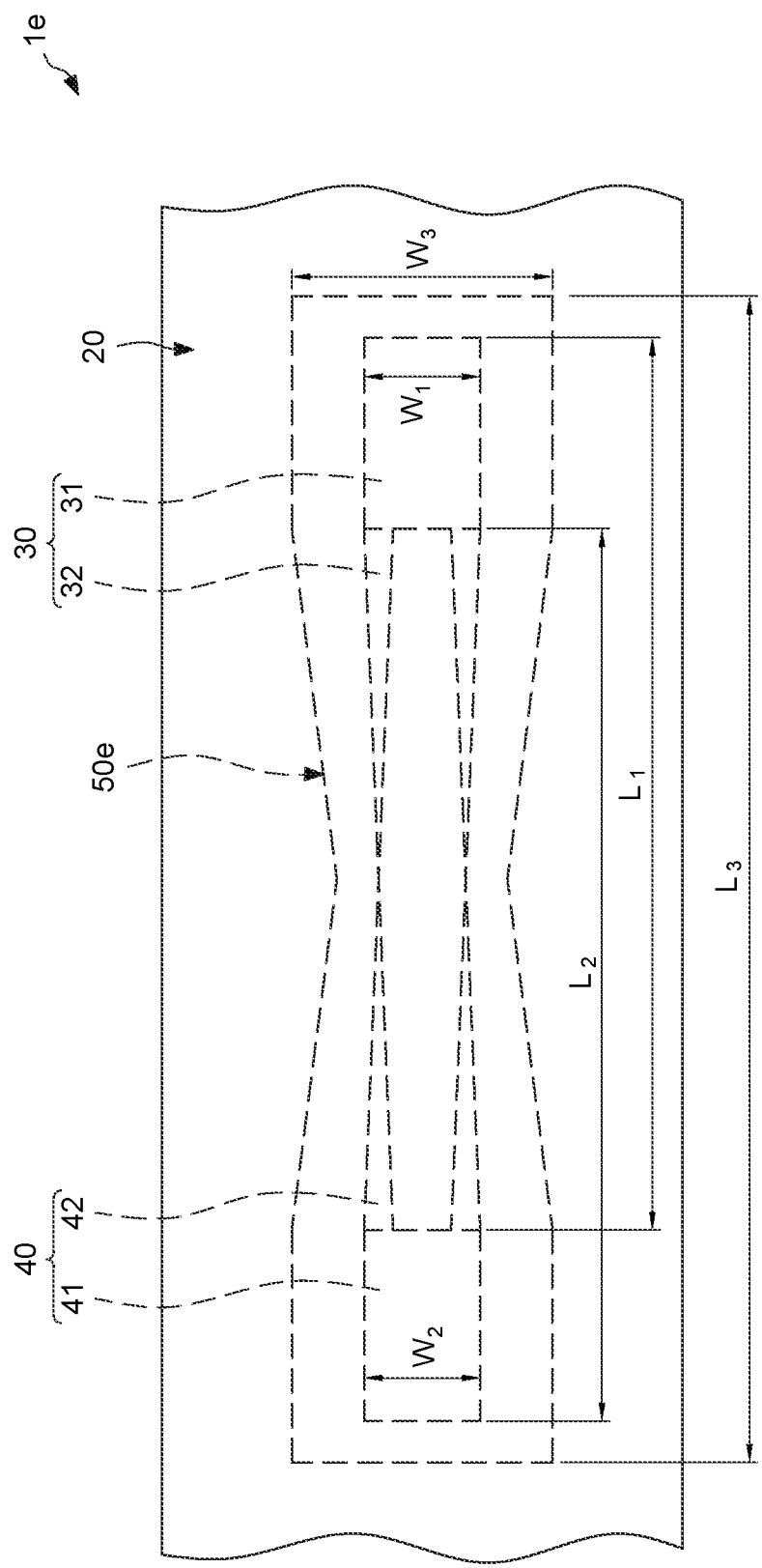
FIG. 10 illustrates a top view of a photonic structure according to some embodiments of the present disclosure.

FIG. 10 illustrates a top view of a photonic structure 1*e* according to some embodiments of the present disclosure. The photonic structure 1*e* of FIG. 10 is similar to the photonic structure 1 of FIG. 1, except for a shape of the high-dielectric constant material 50*e*. In some embodiments, as shown in FIG. 10, the shape of the high-dielectric constant material 50*e* can be an enlarged shape of the contours of the first waveguide layer 30 and the second waveguide layer 40.

FIG. 11 through FIG. 19 illustrate a method for manufacturing a photonic structure according to some embodiments of the present disclosure. In some embodiments, the method is for manufacturing the photonic structure 1 shown in FIG. 2.

Figure 11:
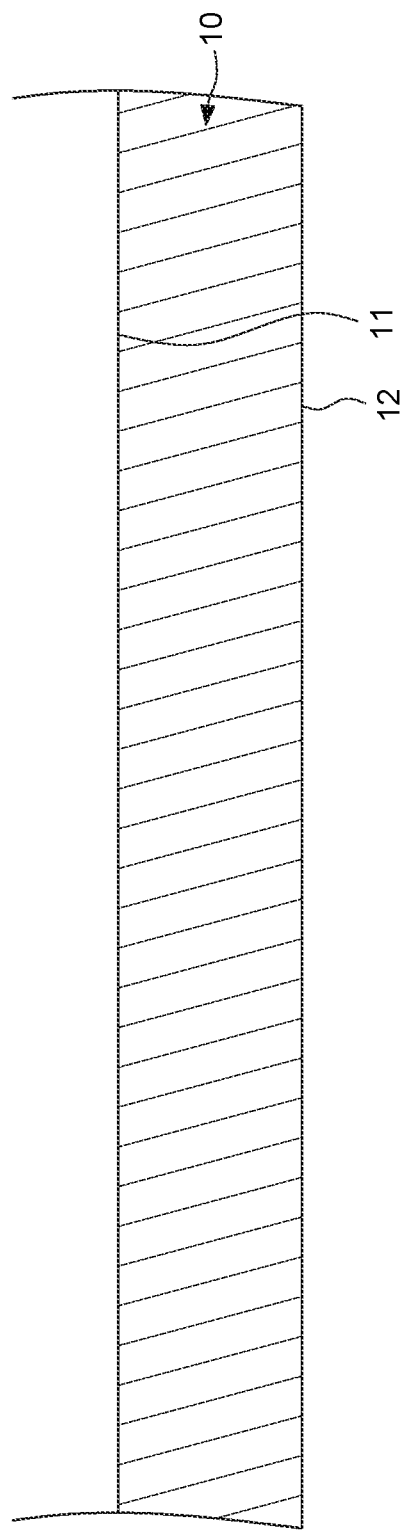
FIG. 11 illustrates a cross-sectional view of one or more stages of an example of a method for manufacturing a photonic structure according to some embodiments of the present disclosure.

Referring to FIG. 11, a substrate 10 is provided. The substrate 10 can be, for example, silicon substrate. The substrate 10 has a first surface 11 (e.g., a top surface) and a second surface 12 (e.g., a bottom surface) opposite to the first surface 11.

Figure 12:
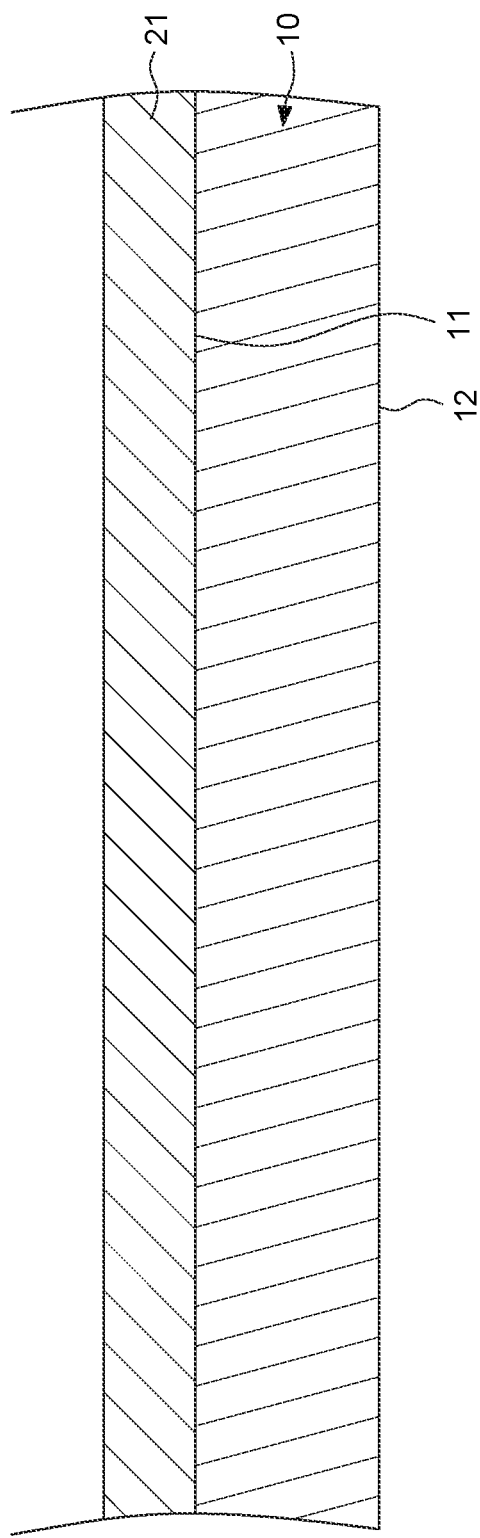
FIG. 12 illustrates a cross-sectional view of one or more stages of an example of a method for manufacturing a photonic structure according to some embodiments of the present disclosure.

Referring to FIG. 12, a first insulating layer 21 is formed or disposed on the first surface 11 (i.e., the top surface) of the substrate 10. A material of the first insulating layer 21 can be, for example, a low-dielectric constant (low-κ) material or a low-refractive index material. In some embodiments, the material of the first insulating layer 21 can be, for example, buried oxide.

Figure 13:
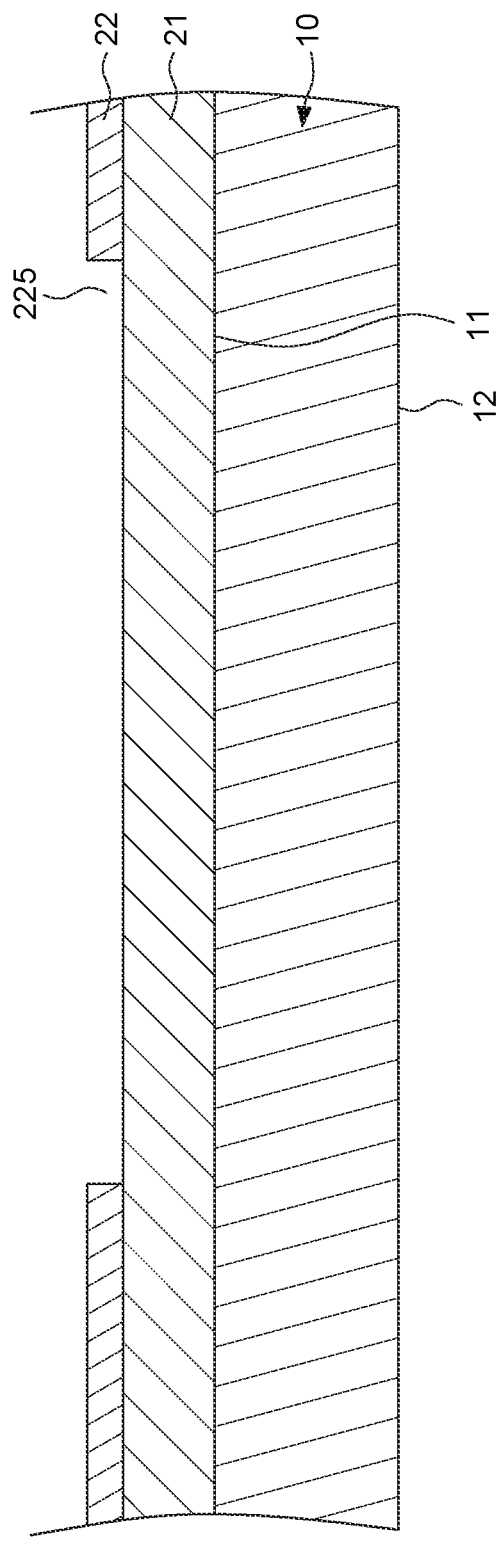
FIG. 13 illustrates a cross-sectional view of one or more stages of an example of a method for manufacturing a photonic structure according to some embodiments of the present disclosure.

Referring to FIG. 13, a second insulating layer 22 is formed or disposed on the first insulating layer 21. A material of the second insulating layer 22 can be different from the material of the first insulating layer 21. In some embodiments, the material of the second insulating layer 22 can be, for example, silicon dioxide ($SiO_2$). Then, the second insulating layer 22 is patterned to form at least one opening 225 to expose a portion of the first insulating layer 21 by an exposure and development technique or other suitable techniques.

Figure 14:
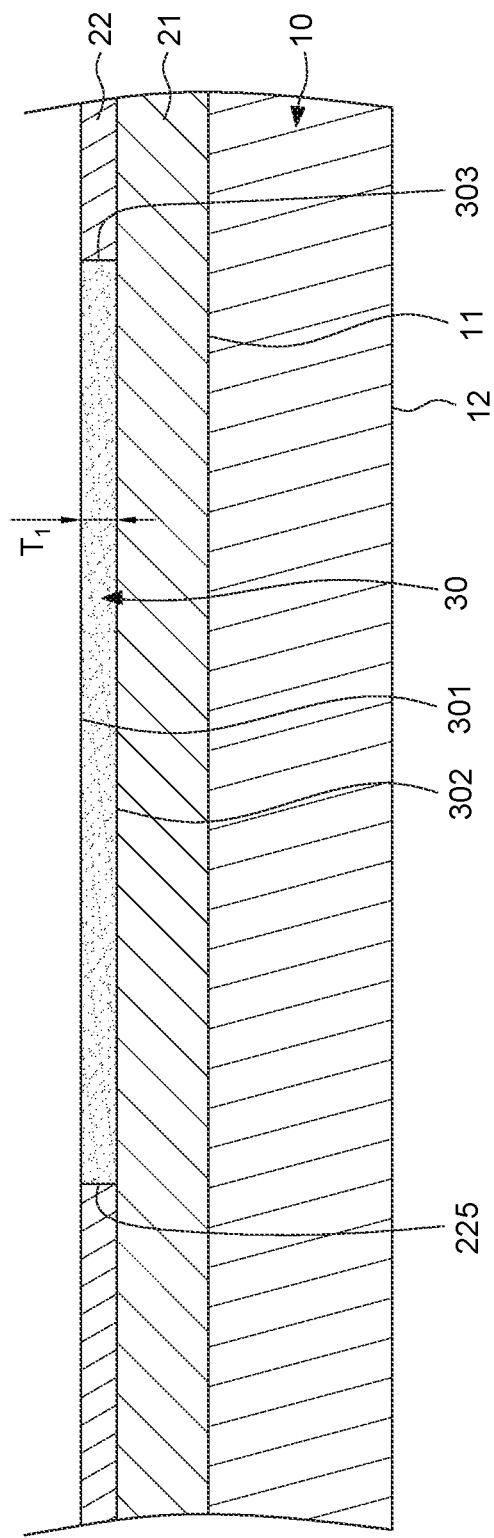
FIG. 14 illustrates a cross-sectional view of one or more stages of an example of a method for manufacturing a photonic structure according to some embodiments of the present disclosure.

Referring to FIG. 14, a first waveguide layer 30 is formed or disposed in the at least one opening 225 of the second insulating layer 22 and on the first insulating layer 21 by a deposition technique or other suitable techniques. Thus, the first waveguide layer 30 extends through the second insulating layer 22. The first waveguide layer 30 of FIG. 14 can be the same as the first waveguide layer 30 of FIG. 2. In some embodiments, the material of the first waveguide layer 30 can be, for example, silicon nitride ($Si_3N_4$) or silicon (Si).

Figure 15:
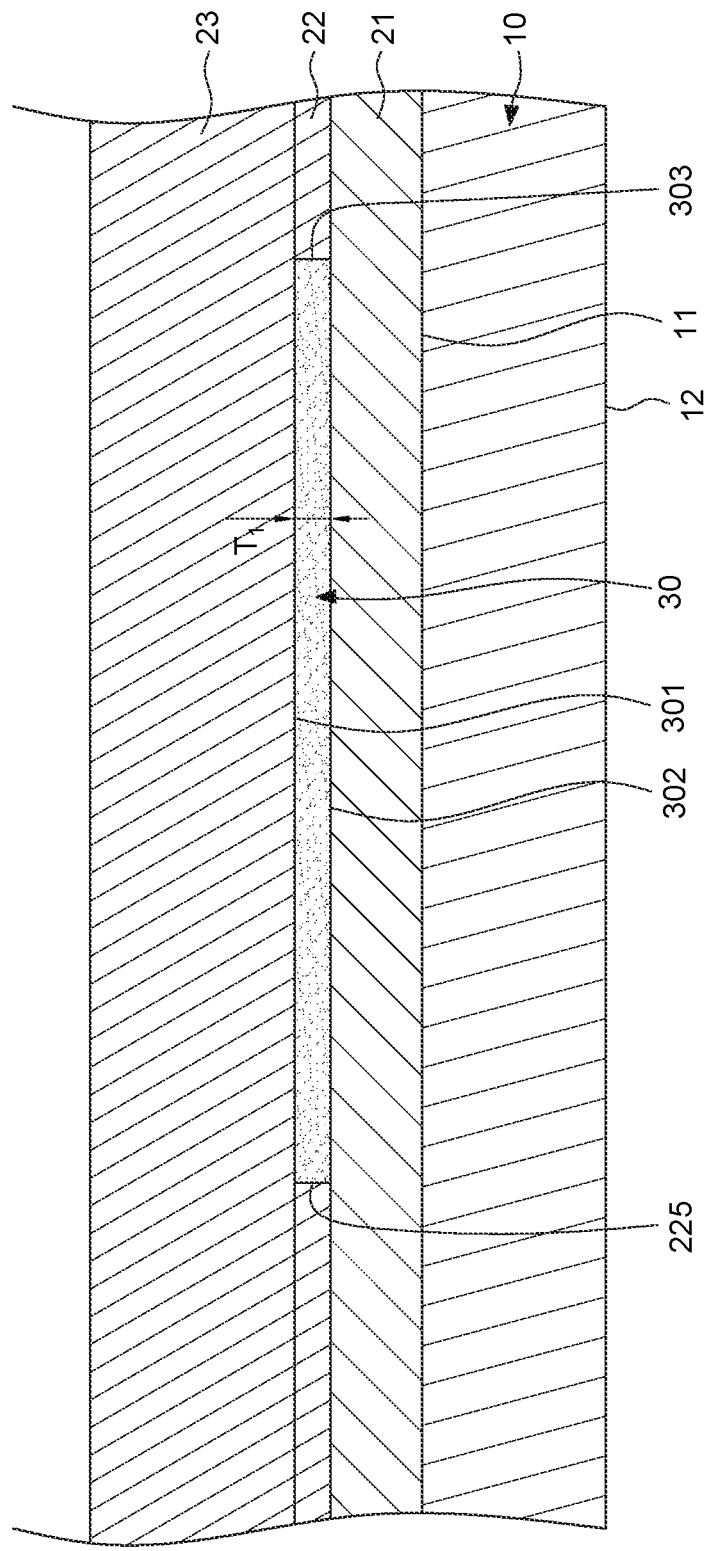
FIG. 15 illustrates a cross-sectional view of one or more stages of an example of a method for manufacturing a photonic structure according to some embodiments of the present disclosure.

Referring to FIG. 15, a third insulating layer 23 is formed to cover the second insulating layer 22 and the first waveguide layer 30. A material of the third insulating layer 23 can be the same as the material of the second insulating layer 22. In some embodiments, the material of the third insulating layer 23 can be, for example, silicon dioxide ($SiO_2$).

Figure 16:
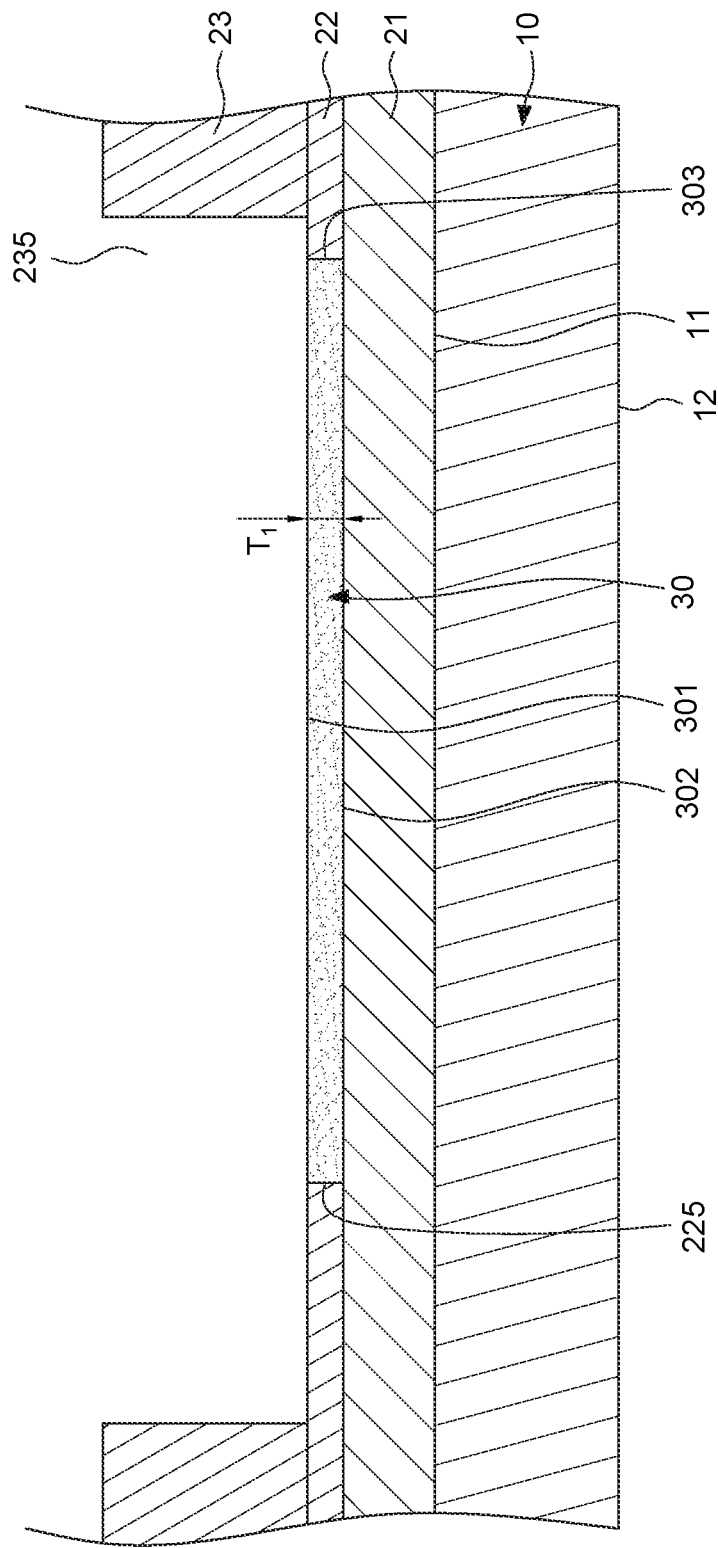
FIG. 16 illustrates a cross-sectional view of one or more stages of an example of a method for manufacturing a photonic structure according to some embodiments of the present disclosure.

Referring to FIG. 16, the third insulating layer 23 is patterned to form at least one opening 235 to expose a portion of the second insulating layer 22 and the first waveguide layer 30 by an exposure and development technique or other suitable techniques.

Figure 17:
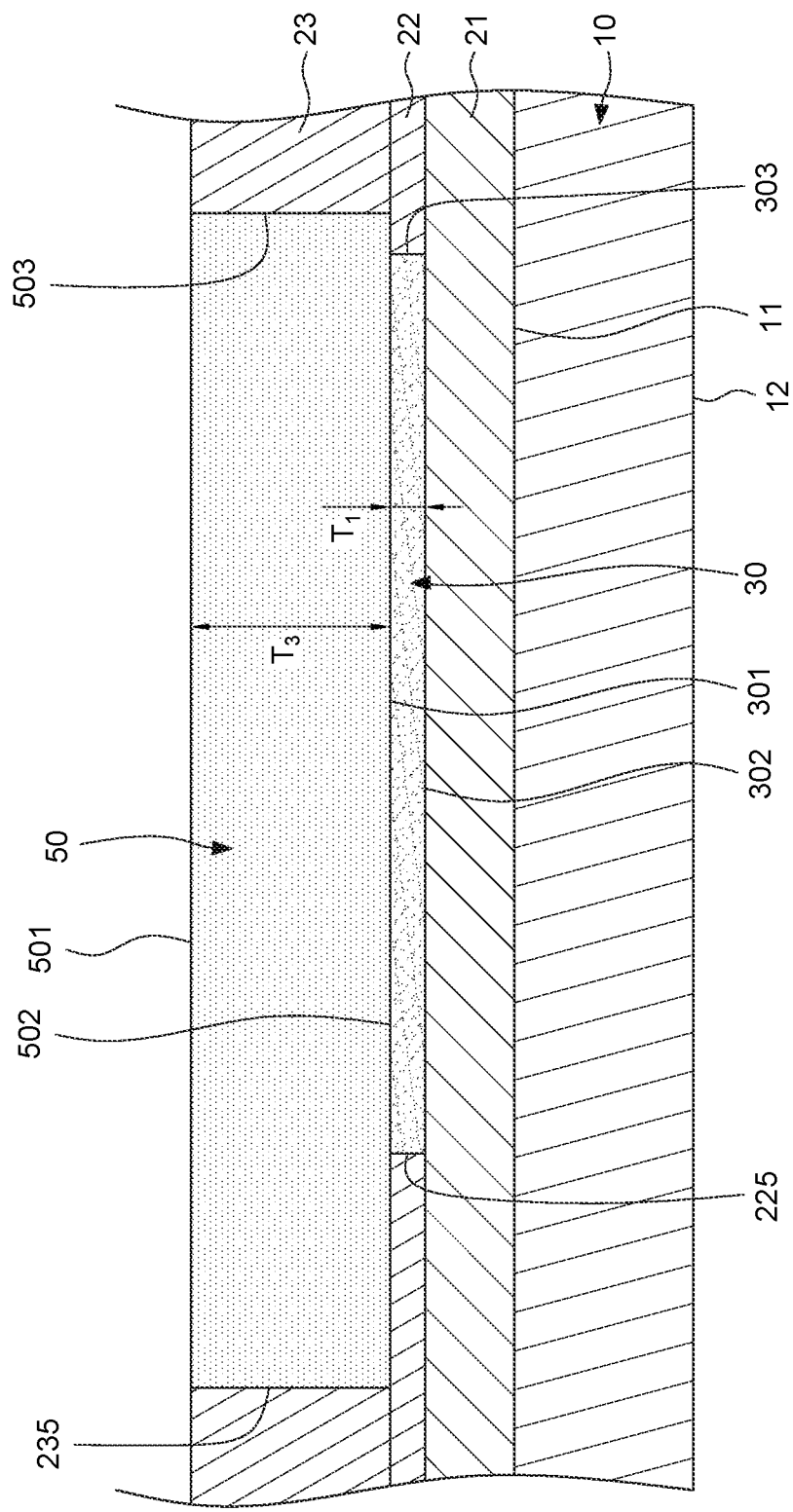
FIG. 17 illustrates a cross-sectional view of one or more stages of an example of a method for manufacturing a photonic structure according to some embodiments of the present disclosure.

Referring to FIG. 17, a high-dielectric constant material 50 is formed or disposed in the at least one opening 235 of the third insulating layer 23 and on the second insulating layer 22 and the first waveguide layer 30 by a deposition technique or other suitable techniques. Thus, the high-dielectric constant material 50 extends through the third insulating layer 23. The high-dielectric constant material 50 of FIG. 17 can be the same as the high-dielectric constant material 50 of FIG. 2. In some embodiments, the high-dielectric constant material 50 can be, for example, titanium dioxide ($TiO_2$), tantalum oxide ($Ta_2O_5$), aluminum oxide ($Al_2O_3$), zirconium dioxide ($ZrO_2$), lanthanum oxide ($La_2O_3$), praseodymium oxide ($Pr_2O_3$) or hafnium dioxide ($HfO_2$).

Figure 18:
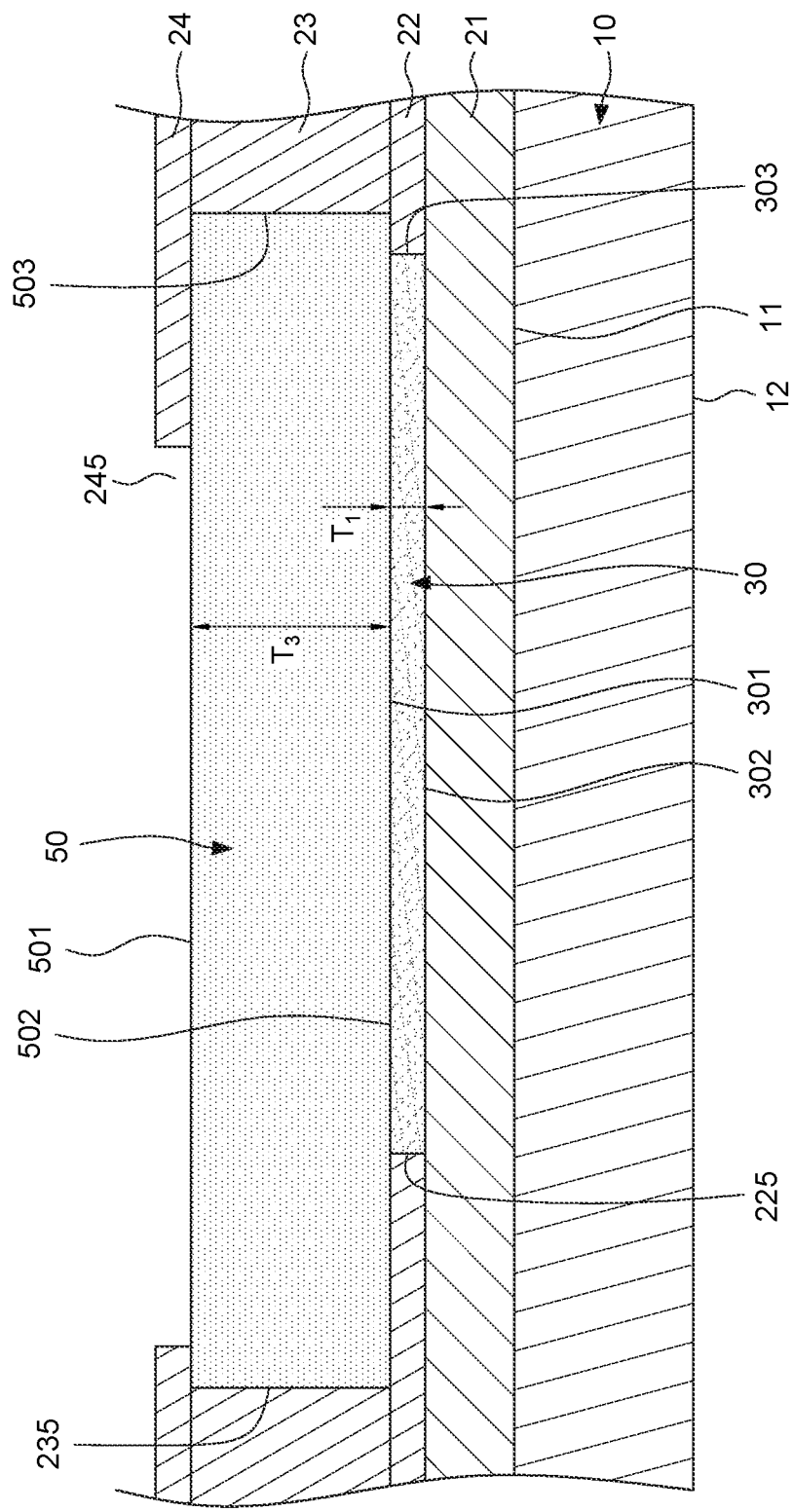
FIG. 18 illustrates a cross-sectional view of one or more stages of an example of a method for manufacturing a photonic structure according to some embodiments of the present disclosure.

Referring to FIG. 18, a fourth insulating layer 24 is formed to cover the third insulating layer 23 and the high-dielectric constant material 50. A material of the fourth insulating layer 24 can be the same as the material of the third insulating layer 23. In some embodiments, the material of the fourth insulating layer 24 can be, for example, silicon dioxide ($SiO_2$). Then, the fourth insulating layer 24 is patterned to form at least one opening 245 to expose a portion of the high-dielectric constant material 50 by an exposure and development technique or other suitable techniques.

Figure 19:
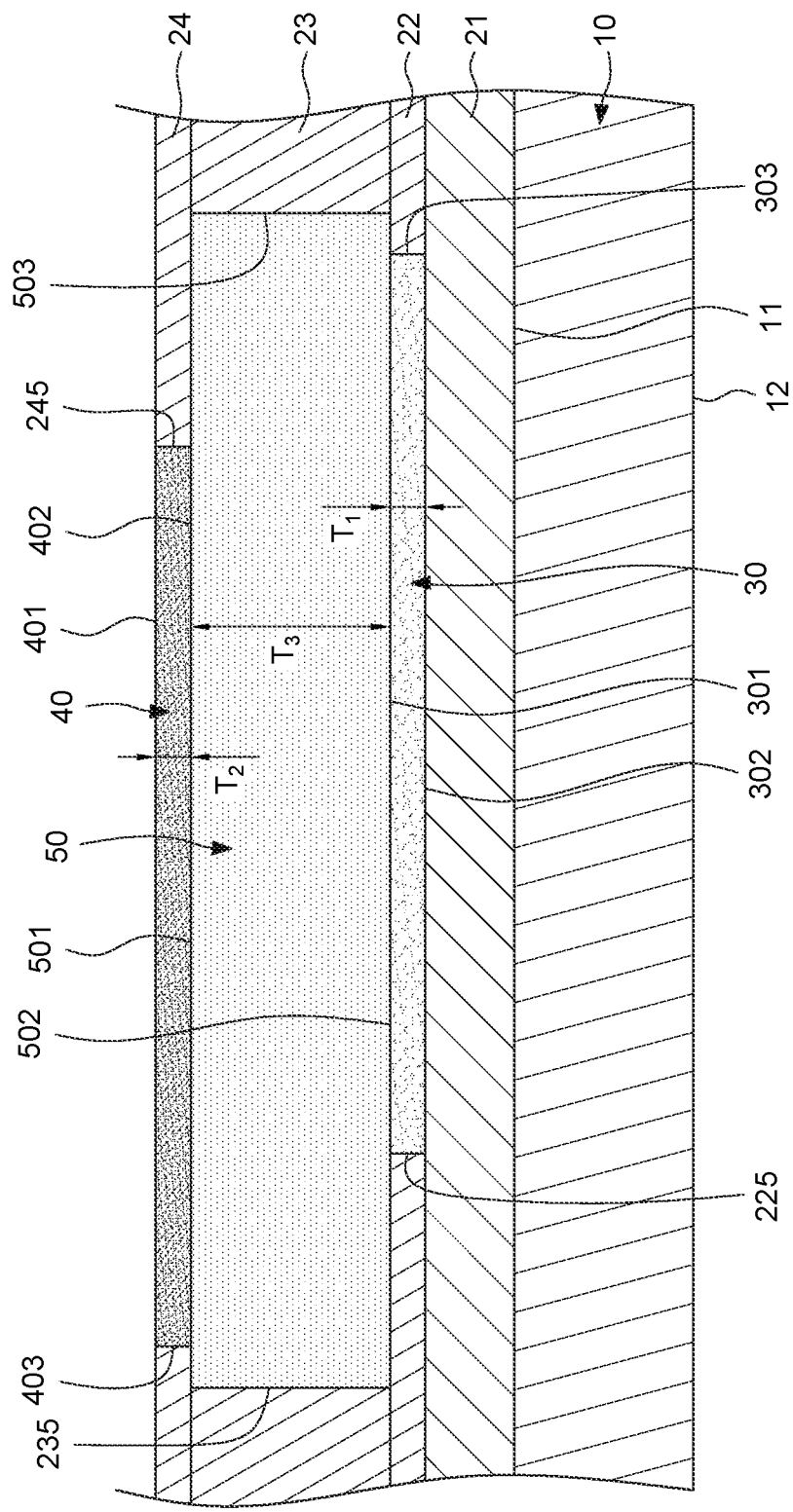
FIG. 19 illustrates a cross-sectional view of one or more stages of an example of a method for manufacturing a photonic structure according to some embodiments of the present disclosure.

Referring to FIG. 19, a second waveguide layer 40 is formed or disposed in the at least one opening 245 of the fourth insulating layer 24 and on the high-dielectric constant material 50 by a deposition technique or other suitable techniques. Thus, the second waveguide layer 40 extends through the fourth insulating layer 24. The second waveguide layer 40 of FIG. 19 can be the same as the second waveguide layer 40 of FIG. 2. In some embodiments, the material of the second waveguide layer 40 can be, for example, silicon nitride ($Si_3N_4$) or silicon (Si).

Then, a fifth insulating layer 25 is formed to cover the fourth insulating layer 24 and the second waveguide layer 40 to obtain the photonic structure 1 of FIG. 2.

Figure 20:
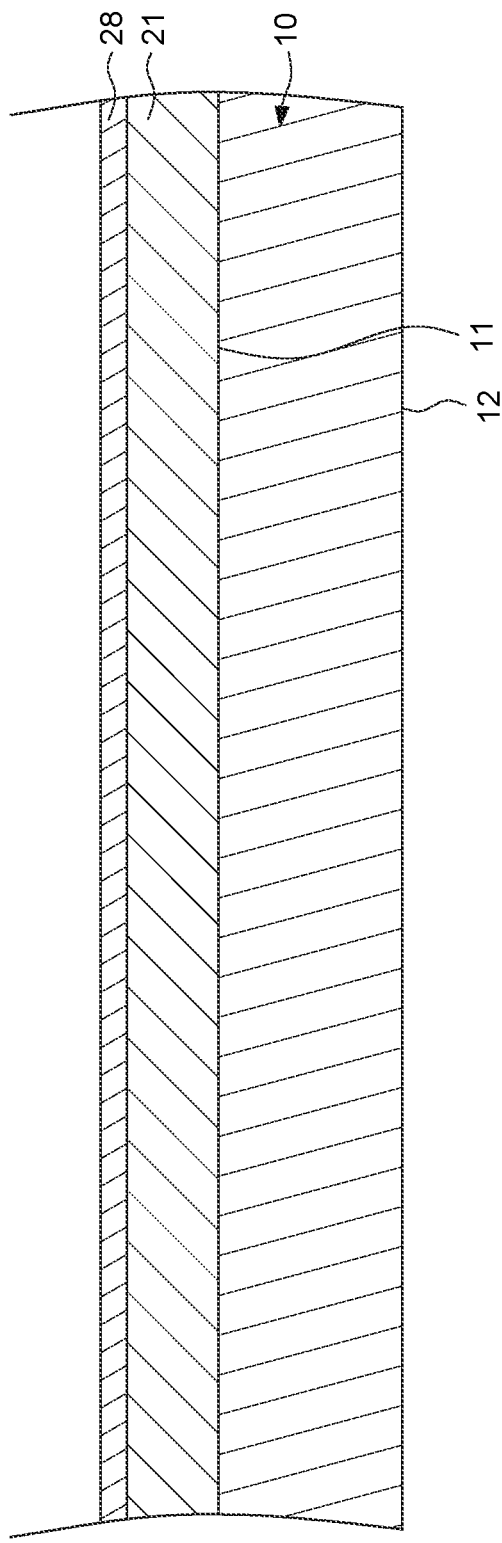
FIG. 20 illustrates a cross-sectional view of one or more stages of an example of a method for manufacturing a photonic structure according to some embodiments of the present disclosure.
Figure 21:
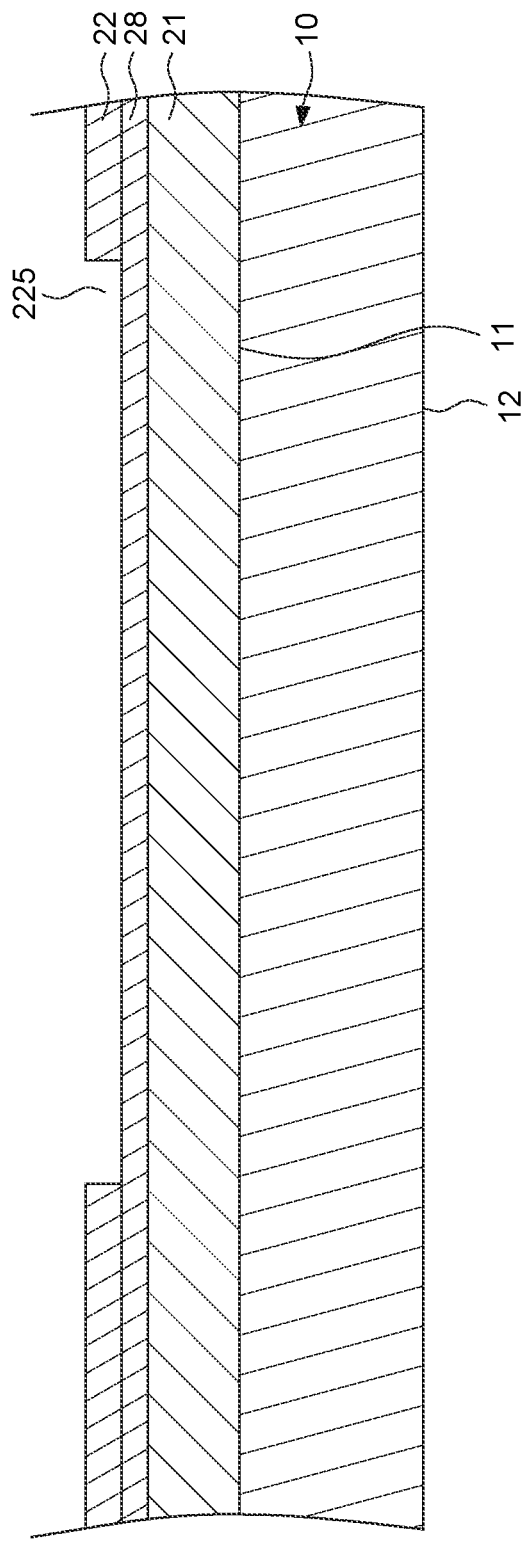
FIG. 21 illustrates a cross-sectional view of one or more stages of an example of a method for manufacturing a photonic structure according to some embodiments of the present disclosure.

FIG. 20 through FIG. 21 illustrate a method for manufacturing a photonic structure 1a according to some embodiments of the present disclosure. The initial stages of the illustrated process are the same as, or similar to, the stages illustrated in FIG. 11 through FIG. 12. FIG. 20 depicts a stage subsequent to that depicted in FIG. 12.

Referring to FIG. 20, a support insulating layer 28 is formed or disposed on the first insulating layer 21. A material of the support insulating layer 28 can be different from the material of the first insulating layer 21. In some embodiments, the material of the support insulating layer 28 can be, for example, silicon dioxide ($SiO_2$). In some embodiments, a thickness of the support insulating layer 28 can be less than a thickness of the first insulating layer 21.

Referring to FIG. 21, a second insulating layer 22 is formed or disposed on the support insulating layer 28. That is, the support insulating layer 28 is formed between the first insulating layer 21 and the second insulating layer 22. A material of the second insulating layer 22 can be the same as the material of the support insulating layer 28 and different from the material of the first insulating layer 21. In some embodiments, the material of the second insulating layer 22 can be, for example, silicon dioxide ($SiO_2$). Then, the second insulating layer 22 is patterned to form at least one opening 225 to expose a portion of the support insulating layer 28 by an exposure and development technique or other suitable techniques.

Then, the stages illustrated in FIG. 14 through FIG. 19 are conducted to obtain the photonic structure 1a of FIG. 4.

In accordance with some embodiments of the present disclosure, a photonic structure includes a substrate, an insulating structure, a first waveguide layer, a second waveguide layer and a high-dielectric constant material. The insulating structure is located over the substrate. The first waveguide layer is embedded in the insulating structure. The second waveguide layer is embedded in the insulating structure and longitudinally spaced apart from the first waveguide layer. The high-dielectric constant material is disposed between the first waveguide layer and the second waveguide layer.

In accordance with some embodiments of the present disclosure, a photonic structure includes a substrate, an insulating structure, a plurality of waveguide layers and a coupling material. The insulating structure is located over the substrate. The plurality of waveguide layers is embedded in the insulating structure and longitudinally spaced apart from each other. The coupling material transfers light between the plurality of waveguide layers. A dielectric constant of the coupling material is greater than a dielectric constant of the insulating structure.

In accordance with some embodiments of the present disclosure, a method for manufacturing a photonic structure includes: providing a substrate; forming a first insulating layer on the substrate; forming a second insulating layer on the first insulating layer; forming a first waveguide layer extending through the second insulating layer; forming a third insulating layer to cover the second insulating layer and the first waveguide layer; forming a high-dielectric constant material extending through the third insulating layer and on the first waveguide layer; forming a fourth insulating layer to cover the third insulating layer and the high-dielectric constant material; and forming a second waveguide layer extending through the fourth insulating layer and on the high-dielectric constant material.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic structure, comprising:
a substrate;
an insulating structure located over the substrate along a first direction;
a first waveguide layer embedded in the insulating structure and over the substrate along the first direction;
a second waveguide layer embedded in the insulating structure and spaced apart from the first waveguide layer along the first direction; and
a coupling material disposed between the first waveguide layer and the second waveguide layer and configured to transfer light between the first waveguide layer and the second waveguide layer,
wherein the coupling material has a length greater than a length of the first waveguide layer along a second direction different from the first direction and is surrounded by the insulating structure along the second direction, and a dielectric constant of the coupling material is greater than a dielectric constant of the insulating structure.

2. The photonic structure of claim 1, wherein a peripheral surface of the first waveguide layer is misaligned with a peripheral surface of the second waveguide layer along the first direction.

3. The photonic structure of claim 1, wherein a reflective index of the coupling material is greater than a reflective index of the first waveguide layer.

4. The photonic structure of claim 1, wherein the coupling material comprises hafnium dioxide, titanium dioxide, tantalum oxide, aluminum oxide, zirconium dioxide, lanthanum oxide, or praseodymium oxide.

5. The photonic structure of claim 4, wherein the insulating structure comprises silicon oxide.

6. The photonic structure of claim 1, wherein the coupling material has a surface contacting the insulating structure and the first waveguide layer.

7. The photonic structure of claim 1, wherein a reflective index of the coupling material is greater than a reflective index of the second waveguide layer.

8. The photonic structure of claim 1, wherein a reflective index of the coupling material is between a reflective index of the first waveguide layer and a reflective index of the second waveguide layer.

9. The photonic structure of claim 1, wherein the coupling material extends outwardly from a peripheral surface of the first waveguide layer in a top view.

10. A photonic structure, comprising:
a substrate;
an insulating structure located over the substrate along a first direction;
a first waveguide layer and a second waveguide layer arranged along the first direction;
and
a coupling material disposed between the first waveguide layer and the second waveguide layer along the first direction and surrounded by the insulating structure along a second direction different from the first direction, wherein a dielectric constant of the coupling material is greater than a dielectric constant of the insulating structure, and wherein the first waveguide layer has a surface area less than a surface area of the coupling material in a top view.

11. The photonic structure of claim 10, wherein a reflective index of the coupling material is greater than a reflective index of the insulating structure.

12. The photonic structure of claim 10, wherein the coupling material contacts the first waveguide layer, the second waveguide layer, and the insulating structure.

13. The photonic structure of claim 10, wherein a surface, facing the substrate, of the coupling material contacts both the first waveguide layer and the insulating structure.

14. The photonic structure of claim 10, wherein the coupling material comprises hafnium dioxide, titanium dioxide, tantalum oxide, aluminum oxide, zirconium dioxide, lanthanum oxide, or praseodymium oxide.

15. The photonic structure of claim 14, wherein a surface area of the second waveguide layer is greater than the surface area of the coupling material in the top view.

16. A method for manufacturing a photonic structure, comprising:
providing a substrate;
forming an insulating structure over the substrate along a first direction;
forming a first waveguide layer over the substrate;
forming a coupling material over the first waveguide layer along the first direction;
forming a second waveguide layer over the coupling material along the first direction,
wherein the coupling material is surrounded by the insulating structure along a second direction substantially orthogonal to the first direction,
and wherein a dielectric constant of the coupling material is greater than a dielectric constant of the insulating structure, and the coupling material has a length greater than a length of the first waveguide layer along the second direction.

17. The method of claim 16, wherein a reflective index of the coupling material is greater than a reflective index of the insulating structure.

18. The method of claim 16, wherein a reflective index of the coupling material is greater than a reflective index of the first waveguide layer.

19. The method of claim 16, wherein the coupling material comprises hafnium dioxide, titanium dioxide, tantalum oxide, aluminum oxide, zirconium dioxide, lanthanum oxide, or praseodymium oxide.

20. The method of claim 16, wherein the coupling material extends outwardly from a peripheral surface of the first waveguide layer.

* * * * *